United States Patent [19]

Skeel

[11] Patent Number: 4,530,427

[45] Date of Patent: Jul. 23, 1985

[54] PARKING BRAKE DECLUTCHING SYSTEM

[75] Inventor: James C. Skeel, West Terre Haute, Ind.

[73] Assignee: J. I. Case Company, Racine, Wis.

[21] Appl. No.: 448,118

[22] Filed: Dec. 9, 1982

[51] Int. Cl.³ .............................................. B60K 41/24
[52] U.S. Cl. ................................................... 192/4 A
[58] Field of Search ..................... 192/4 A, 13 A, 4 R

[56] References Cited

U.S. PATENT DOCUMENTS

| | | | |
|---|---|---|---|
| 3,565,220 | 2/1971 | Lammers et al. | 192/4 A |
| 3,589,484 | 6/1971 | Lammers et al. | 192/4 A |
| 3,978,946 | 9/1976 | Ream | 192/4 A |
| 4,355,698 | 10/1982 | Barnes et al. | 192/4 A |

*Primary Examiner*—George H. Krizmanich
*Attorney, Agent, or Firm*—Cullen, Sloman, Cantor, Grauer, Scott & Rutherford

[57] ABSTRACT

A parking brake declutching system which places an earth-working machine transmission in neutral when the parking brake is engaged and prevents the transmission from being re-engaged until the parking brake is released. The parking brake declutching system includes a parking brake valve, a declutch valve, and a pair of service brake valves with the parking brake valve being connected to a spring applied, air released parking brake actuator. The declutch valve is also connected to the parking brake actuator and to a clutch cut-out actuator which selectively disengages the transmission. When the parking brake valve is positioned to actuate the parking brake, the declutch valve is positioned to direct compressed air to actuate the clutch cut-out actuator which disengages the transmission for the machine. If the parking brake valve is opened, compressed air is directed to the parking brake actuator for disengaging the parking brake. Simultaneously, air is directed to the declutch valve to position the declutch valve for releasing the clutch cut-out actuator by permitting the exhaust of air from the cut-out actuator. The transmission may then be re-engaged since the parking brake is released. The present system also provides a means for temporarily disengaging the transmission while the service brakes are applied which is desirable in some loading conditions for the machine to make maximum engine power available.

2 Claims, 1 Drawing Figure

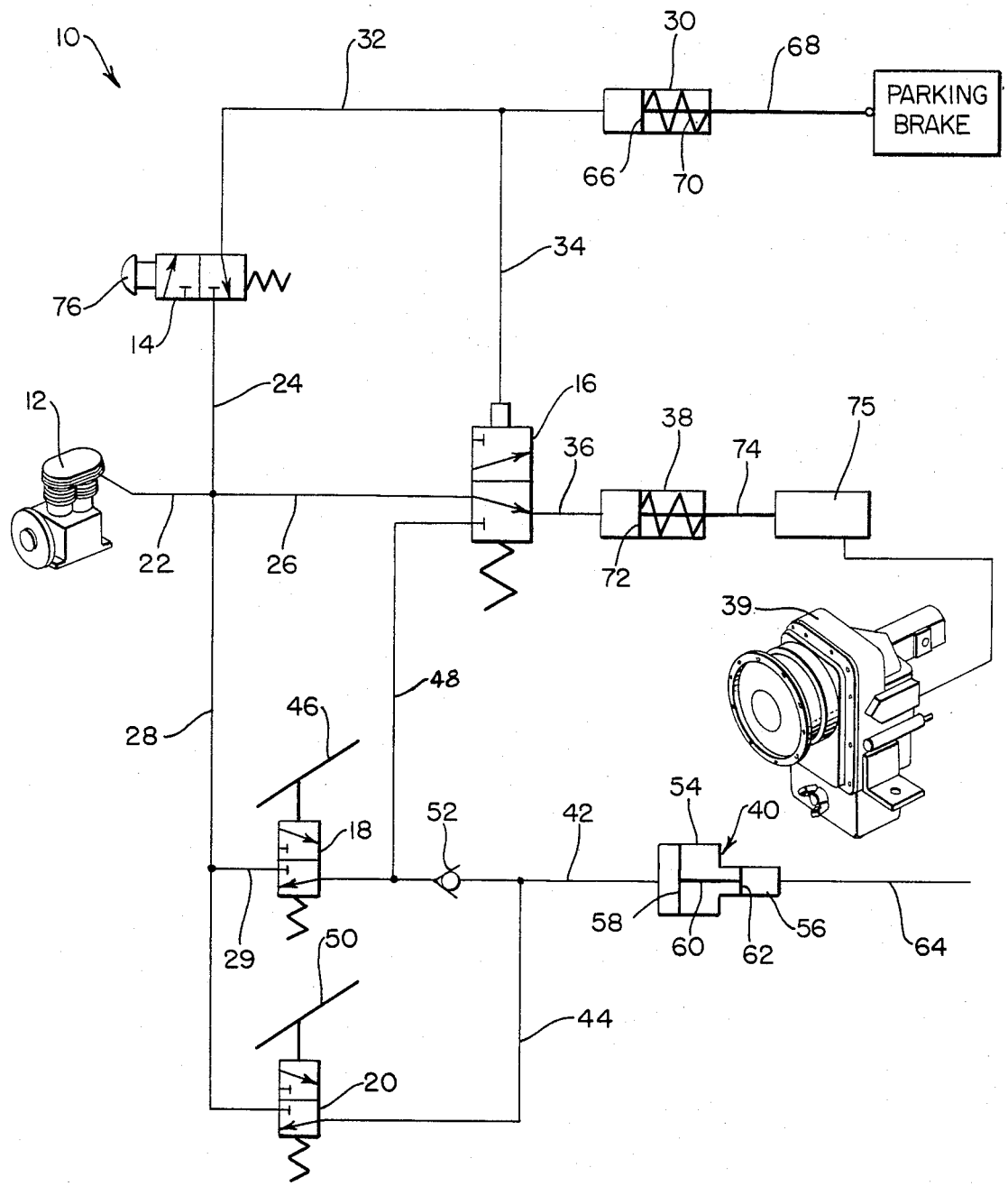

4,530,427

PARKING BRAKE DECLUTCHING SYSTEM

BACKGROUND OF THE INVENTION

The present invention relates to a parking brake declutching system that automatically places a transmission in neutral when the parking brake is set and permits the transmission to be re-engaged only when the parking brake is released.

It is conventional to provide earth-working machines with a parking brake that is normally spring applied and fluid pressure released. Thus, the parking brake after being engaged remains engaged until control pressure is directed to the parking brake actuator for disengaging it.

A problem arises in that the earth-working machine engine is capable of moving the machine with the parking brake engaged. If the operator should forget to disengage the parking brake and begin to drive the machine, the engine can overpower the parking brake thereby damaging the brake system for the machine. Thus, there has been a need for a parking brake declutching system where the parking brake actuator is interconnected with the transmission to place the transmission in neutral when the parking brake is set. Further, the parking brake declutching system should prevent re-engagement of the transmission until the parking brake is released.

SUMMARY OF THE INVENTION

In accordance with the present invention, a parking brake declutching system is provided whereby the parking brake actuator is interconnected with the transmission to place the transmission in neutral when the parking brake is set. Further, when the parking brake is engaged, it is not possible to operate the machine transmission and therefore, the parking brake will not be damaged because of operating the machine while the parking brake is engaged.

The parking brake declutching system includes an air compressor which discharges air under pressure to a parking brake valve, a declutch valve, and a pair of foot operated service brake valves. The parking brake valve is connected to a spring applied-air released parking brake actuator for the parking brake. The declutch valve is also connected to the parking brake actuator and further connected to a clutch cut-out actuator which selectively disengages a conventional hydraulic transmission for the machine. The service brake valves are connected to at least one service brake actuator and the depression of a foot pedal for either service brake valve causes the delivery of compressed air to the service brake actuator. One of the service brake valves is also connected to the declutch valve.

When the parking brake is positioned for permitting actuation of the parking brake, the declutch valve is positioned to direct air to actuate the clutch cut-out actuator which disengages the transmission for the machine. If the parking brake valve is opened, compressed air is directed to the parking brake actuator for disengaging the parking brake. Simultaneously, air is directed to the declutch valve to position the declutch valve for releasing the clutch cut-out actuator by permitting the exhaust of air from the clutch cut-out actuator through one of the service brake valves. The transmission may then be engaged since the parking brake is released.

Thus, the parking brake declutching system of the present invention provides a control system which places the machine transmission in neutral when the parking brake is engaged and prevents the transmission from being re-engaged until the parking brake is released.

The present system also permits the disengagement of the transmission when the service brake valve, that is connected to the declutch valve, is opened. This provides a means for temporarily disengaging the transmission while the service brakes are applied which is desirable in some loading conditions for the machine to make maximum engine power available.

Other advantages and meritorious features of the parking brake declutching system of the present invention will be more fully understood from the following description of the preferred embodiment, the appended claims, and the drawing, a brief description of which follows.

BRIEF DESCRIPTION OF DRAWING

The single FIGURE drawing is a schematic illustration of the parking brake declutching system of the present invention.

DETAILED DESCRIPTION OF THE INVENTION

A preferred embodiment of the parking brake declutching system made in accordance with the teachings of the present invention is illustrated in the single FIGURE drawing.

The parking brake declutching system 10 includes an air compressor 12 which discharges air under pressure to spring biased parking brake valve 14, spring biased declutch valve 16, and spring biased service brake valves 18 and 20. The discharge line 22 from compressor 12 is connected to valves 14, 16, 18 and 20 by conduits 24, 26, 28 and 29, respectively. Parking brake valve 14 is connected to the air supply end of parking brake actuator 30 by conduit 32. Declutch valve 16 is also connected to parking brake actuator 30 by conduit 34. Valve 16 is further connected by conduit 36 to clutch cut-out actuator 38 which selectively disengages a conventional hydraulic transmission 39.

At least one service brake actuator 40 is connected to brake valves 18 and 20 by conduits 42 and 44. The depression of foot pedal 46 for valve 18 causes the delivery of air under pressure through conduit 42 to brake actuator 40 and the delivery of air under pressure to declutch valve 16 through conduit 48. If the foot pedal 50 for valve 20 is depressed, air is only delivered to brake actuator 40 because of the check valve 52 in conduit 42 between valves 20 and 18.

Brake actuator 40 is a conventional assembly consisting of an air chamber 54 and hydraulic master cylinder 56. The compressed air directed to air chamber 54 by either valve 18 or 20 acts on piston 58 and push rod 60 in the air chamber. Push rod 60, in turn, acts on piston 62 in the master cylinder 56 to build up pressure in the service brake hydraulic system (not shown) which is connected to actuator 40 by conduit 64. The service brakes for the machine (not shown) are conventional disc brakes, and as the hydraulic pressure increases, the pistons in the disc brakes move outwardly, forcing brake shoes against the brake discs.

The parking brake actuator 30 is of a conventional design for being spring applied and fluid pressure released. Actuator 30 includes piston 66, piston push rod 68, and spring 70. The piston push rod 68 of actuator 30 is operatively connected to a parking brake lever (not shown) for operation of conventional brake shoes or bands which function as a parking brake. Parking brake valve 14 is opened to direct air against piston 66 in actuator 30 for extending piston rod 68 thereby disengaging the parking brake. As illustrated in the drawing, valve 14 is closed and positioned to vent fluid from actuator 30 such that the spring 70 in actuator 30 expands for engaging the parking brake (not shown).

When the parking brake valve 14 is positioned to actuate the parking brake, as shown in the drawing, declutch valve 16 is positioned to direct air to actuate the clutch cut-out actuator 38 which disengages the transmission 39 for the machine (not shown). Clutch cut-out actuator 38 is conventional and includes a piston 72 and push rod 74 which is operatively connected to a conventional clutch cut-out spool (not shown) in the control valve 75 for the transmission 39. In the position shown in the drawing, declutch valve 16 directs compressed air against piston 72 for extending push rod 74 thereby placing the transmission 39 in neutral.

When the parking brake valve 14 is opened by pushing button 76 inwardly, compressed air is directed against piston 66 in actuator 30 for disengaging the parking brake. Simultaneously, air is directed to declutch valve 16 through conduit 34 to position valve 16 for releasing clutch cut-out actuator 38 by permitting the exhaust of air from actuator 38 through conduits 36 and 48 to service brake valve 18. The transmission 39 may then be re-engaged since the parking brake is released.

Thus, parking brake declutching system 10 provides a control system which places transmission 39 in neutral when the parking brake (not shown) is engaged and prevents the transmission from being re-engaged until the parking brake is released.

The present system also permits the disengagement of transmission 39 when foot operated brake valve 18 is opened by depressing foot pedal 46. As described, when parking brake valve 14 is opened, actuator 30 disengages the parking brake and declutch valve 16 is positioned to release clutch cut-out actuator 38. The release position for valve 16 permits fluid communication between conduits 36 and 48. Thus, if foot pedal 46 is subsequently depressed, compressed air is directed to service brake actuator 40 and to clutch cut-out actuator 38 through conduit 48, alve 16 and conduit 36 for placing transmission 39 in neutral. This provides a means for temporarily disengaging transmission 39 while the service brakes (not shown) are applied which is desirable in some loading conditions for the machine to make maximum engine power available.

It will be apparent to those skilled in the art that the foregoing disclosure is exemplary in nature rather than limiting, the invention being limited only by the appended claims.

I claim:

1. A parking brake declutching system for neutralizing a transmission for a machine when a parking brake for the machine is engaged, said parking brake declutching system including means for discharging fluid under pressure to a parking brake valve, a declutch valve, and a service brake valve, said parking brake valve connected to a parking brake actuator which is spring applied for engaging said parking brake and fluid released for disengaging said parking brake, said declutch valve connected to said parking brake valve, said parking brake actuator, and to a clutch cut-out actuator which is operable to disengage said transmission, and said service brake valve connected to said declutch valve;

said parking brake valve being closed for venting fluid from said parking brake actuator thereby enabling said parking brake actuator to engage said parking brake and said declutch valve being positioned in a first position when said parking brake valve is closed to direct fluid under pressure to said clutch cut-out actuator for disengaging said transmission; and said parking brake valve being opened for directing fluid under pressure to said parking brake actuator thereby enabling said parking brake actuator to disengage said parking brake and said declutch valve being positioned in a second position in response to said parking brake valve being opened for exhausting fluid from said clutch cut-out actuator to said service brake valve thereby permitting said transmission to be re-engaged; and wherein said service brake valve connected to a service brake actuator and said service brake valve being operable to direct fluid under pressure to said service brake actuator and to said clutch cut-out actuator for disengaging said transmission when said declutch valve is in its second position.

2. The parking brake declutching system as defined in claim 1 wherein said service brake valve connected to a service brake actuator and said service brake valve being operable to direct fluid under pressure to said service brake actuator and to said clutch cut-out actuator for disengaging said transmission when said declutch valve is in its second position.

* * * * *